United States Patent [19]

Walker et al.

[11] 4,094,935
[45] June 13, 1978

[54] EVAPORATIVE COOLING SYSTEM

[75] Inventors: Wesley M. Walker; Robert W. Walker; Dean M. Walker, all of Loveland, Colo.

[73] Assignee: Walker Manufacturing Company, Ft. Collins, Colo.

[21] Appl. No.: 747,396

[22] Filed: Dec. 3, 1976

[51] Int. Cl.² .............................................. B60H 1/26
[52] U.S. Cl. ..................................... 261/80; 98/2.14; 261/DIG. 4
[58] Field of Search .......... 261/80, DIG. 4, DIG. 15; 98/2.14

[56] References Cited

U.S. PATENT DOCUMENTS

| 1,622,131 | 3/1927 | Crispin | 261/80 |
| 1,976,401 | 10/1934 | Ilg | 261/80 |
| 3,075,333 | 1/1963 | Revell | 261/80 |
| 3,252,691 | 5/1966 | Getzin et al. | 261/80 |
| 3,290,020 | 12/1966 | Findley | 261/29 |
| 3,370,403 | 2/1968 | D'Elia et al. | 261/80 |
| 3,814,393 | 6/1974 | Malmgren | 261/80 |

FOREIGN PATENT DOCUMENTS 25,170 of 1899 United Kingdom ................... 261/80

Primary Examiner—Frank W. Lutter
Assistant Examiner—Gregory N. Clements
Attorney, Agent, or Firm—Hugh H. Drake

[57] ABSTRACT

An evaporative cooling system includes a housing with an outlet in one wall and a pair of inlets in opposing other walls. A pair of endless belts are individually disposed inside the respective inlets with each belt being of a material to which a liquid may cling and transparent to air flow so as to achieve evaporation. A portion of each belt extends through a reservoir and the belts are driven in movement therethrough. Blower apparatus disposed between the belts draws air through the inlets and the belts and exhausts the air through the outlet.

1 Claim, 8 Drawing Figures

EVAPORATIVE COOLING SYSTEM

The present invention relates to an evaporative cooling system. More particularly, its pertains to an arrangement of structure for such a system which enables the achievement of high capacity operation while yet being comparatively compact.

U.S. Pat. No. 3,834,680, issued Sept. 10, 1974, discloses what has proved to be a highly successful evaporative-type cooler. Although it is adaptable to the cooling of other kinds of enclosures, one of its greatest usages so far has been in connection with its mounting on top of the cab of a vehicle such as an agricultural machine. It is fully capable of supplying substantially cooled and filtered air into the cab. The cooler uses a cylindrical drum or belt of a material to which water may cling and which is sufficiently transparent to the flow of air therethrough as to achieve evaporation of the water on the drum by the air. A reservoir of water is maintained in a position through which a portion of the drum extends. The air is propelled through the drum, and, in turn, the lower portion of the durm is moved through the water in the reservoir. The air propelled through the moistened material on the drum is exhausted into the vehical cab or other enclosure. Various splash panels and the like are provided in order to guard against the splashing of water from the reservoir into the air outlet.

In principle, the apparatus of the aforementioned patent is not limited in cooling capacity. That is, it, and all of its components proportionately, may be expanded in physical size as necessary to achieve the desired degree of cooling of a larger enclosure than, for example, a vehicle cab. For a comparatively large residential of office enclosure, however, the cooler tends to become unduly bulky.

It is, accordingly, a general object of the present invention to provide a new and improved evaporative cooling system that enables the achievement of increased cooling capacity while still being reasonably compact.

Another object of the present invention is to provide a new and improved evaporative cooling system in which the evaporative elements are in themselves compact and yet so arranged as to enable their easy removeability for purposes of cleaning or replacement.

A further object of the present invention is to provide a new and improved evaporative cooling system in which the basic combination of the principal components is such as to afford flexibility in the location to be chosen for the cooled-air outlet.

In one aspect, the invention is directed to an evaporative cooling system which includes a housing that has an outlet opening disposed in one wall and a pair of inlet openings disposed in opposing other walls. A pair of endless belts are individually disposed within the housing and adjacent to respective ones of the inlet openings. Each of those belts is of a material to which a liquid may cling and sufficiently transparent to the flow of air therethrough to achieve evaporation of the liquid on the belt by the air. A liquid reservoir is disposed in the housing, and a portion of each of the belts extends through that reservoir. Also included are means for moving each of the belts through the liquid in the reservoir. Finally, blower apparatus is disposed in the housing between the belts for drawing air through the inlets and the belts and exhausting the cooled air through the outlet opening.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
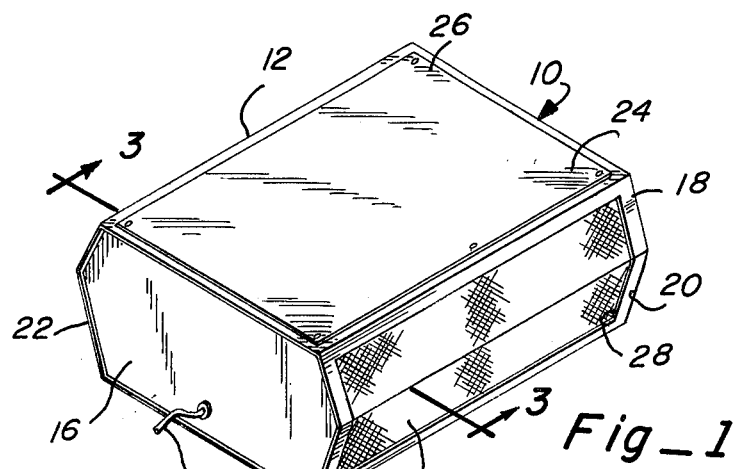
FIG. 1 is a perspective view of an evaporative cooling unit which constitutes one embodiment of the present invention.
Figure 2:
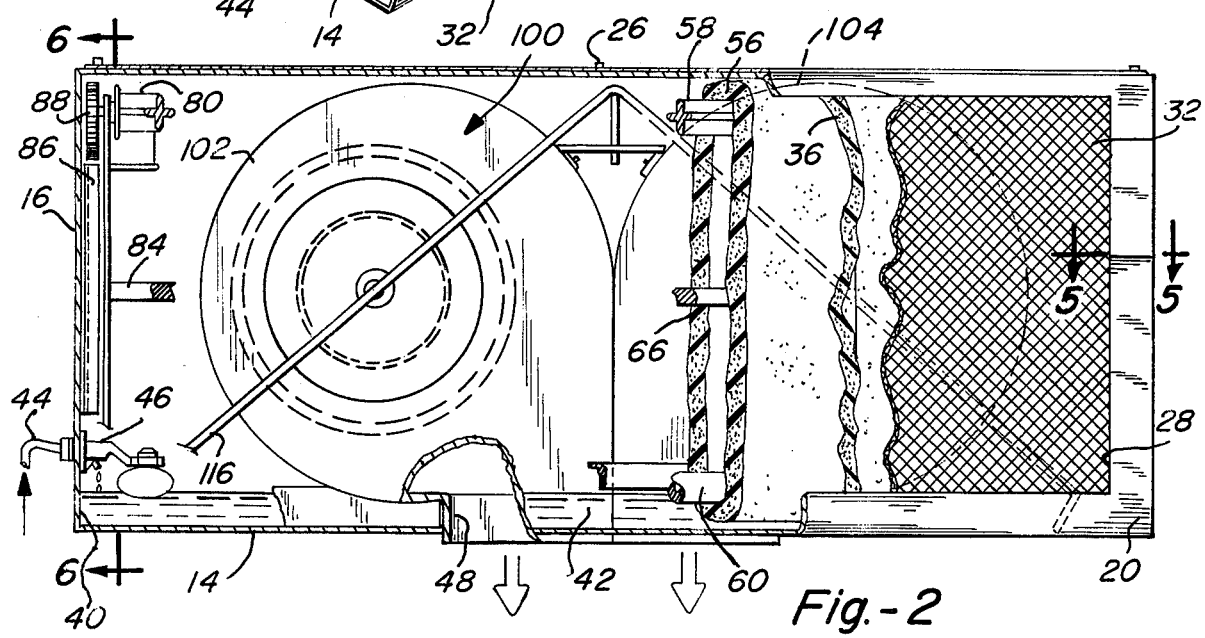
FIG. 2 is a side-elevational view, partially broken away, of the unit of FIG. 1.

As herein embodied, an evaporative cooler unit 10 includes a housing 12 that has a bottom wall 14, space-opposed end walls 16 and 18, generally vertical side walls 20 and 22 and a removable upper cover 24 secured in place by suitable fasteners as at 26. The housing may be molded from plastic or fabricated of a material such as sheet metal.

Substantially occupying the areas of side walls 20 and 22 are respective air-inlet openings 28 and 30 across which corresponding open-mesh grills 32 and 34 are fixed. Secured against the inner surface of grills 32 and 34 preferably are respective filters 36 and 38 of a dry material such as natural fiber or suitable synthetic.

In the lower portion of housing 12 is defined a reservoir 40 for evaporative liquid 42. Usually, that liquid is simply water, and the use of water will hereinafter be assumed. However, another liquid more effective for evaporative cooling might be substituted. Replenishment of the supply of the water within reservoir 42 is by way of an inlet hose or pipe 44 with the quantity of supply being under the control of a conventional float valve 46.

Formed centrally through bottom wall 14 is an air-outlet or exhaust opening 48 the walls of which extend through and then project above reservoir 40. Thus, the water surrounds outlet 48. Projecting horizontally outward from those walls of opening 48 is a baffle 50. Outer baffle elements 52 and 54 project respectively inward from side walls 20 and 22 and above the surface of the water in reservoir 40. Those baffles tend to shield the surface of the water in reservoir 40 from the effects of air currents flowing through the unit as will be more fully discussed hereinafter.

Disposed immediately inside inlet opening 28 is an endless belt 56 of a material to which water will cling and which is yet sufficiently transparent to the flow of air therethrough as to achieve evaporation of such clinging water on the belt by the air. A suitable material is polyurethane foam. Desirably, that material may be coated with a polyvinal chloride layer in order to inhibit deterioration from ultraviolet radiation.

Belt 56 is mounted for movement around the combination of a respective pair of rollers 58 and 60 that are fixedly spaced-apart on a frame 62. Frame 62 includes bars 64 at opposite ends of rollers 58 and 60 and to which the opposite end portions of the latter are correspondingly journeled for rotation. Within frame 62 is a rod 66 that is secured between the mid-portions of the respective ones of bars 64. With the belt mounted upon rollers 58 and 60, it will be noted that belt 56 conforms to a shape in which it has a hollow oblong cross section elongated in the vertical direction.

The assembly of belt 56 upon rollers 58 and 60 is removeably mounted within housing 12 by means of vertically-oriented channel members 68. Thus, the entire assembly that includes belt 56 may be easily removed for cleaning or the replacement of a new evaporative-filter element. When the belt assembly is mounted in place within the housing, the lower end portion of belt 56 projects into reservoir 40.

On one end of upper roller 58 is a spur gear 70. When the assembly of frame 62 and belt 56 is lowered into place as defined by channel members 68, gear 70 meshes into engagement with a mating gear 72 powered for rotation by a reduction-geared motor 73.

A preferably identical arrangement is disposed on the opposite side of housing 12 and just inside of opening 30. Thus, a belt 74 is mounted upon a frame 76 that includes end bars 78 which journal rollers 80 and 82 and also includes a rigidifying central rod 84. Channel members 86 slidably receive bars 78 so as to mount the belt assembly in place. A spur gear 88 at one end of roller 80 mates with a driving gear 90 powered by a gear-reduced motor 92.

Upper rollers 58 and 80 are in each case splined so as to define longitudinal ribs 94 and 96, respectively, that serve to frictionally engage the corresponding belts 56 and 74. Accordingly, a drive train is completed in each case for moving belts 56 and 74 through water 42 in reservoir 40.

Figure 3:
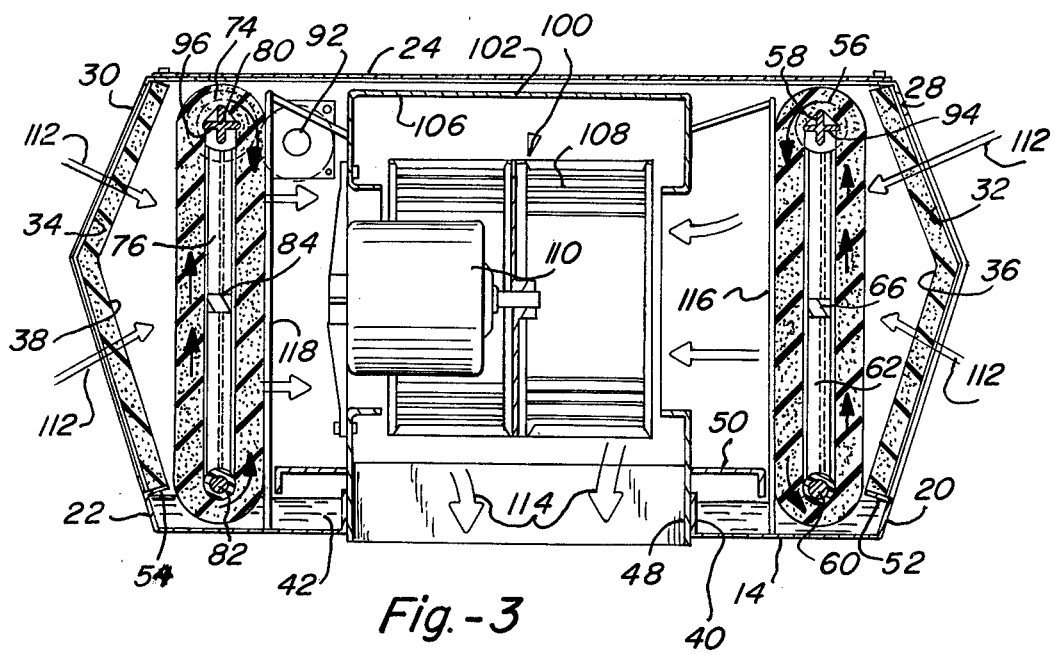
FIG. 3 is a cross-sectional view taken along the line 3—3 in FIG. 1.
Figure 4:
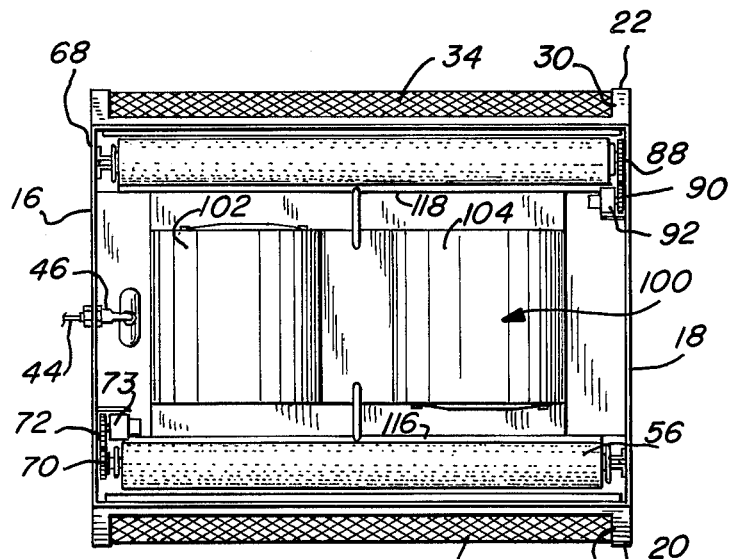
FIG. 4 is a top plan view, with an upper cover removed, of the unit of FIG. 1.
Figure 5:
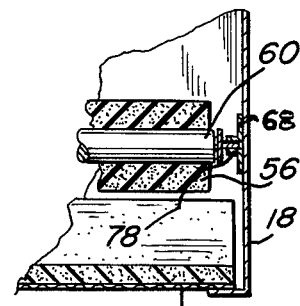
FIG. 5 is a fragmentary cross-sectional view taken along the line 5—5 in FIG. 2.
Figure 6:
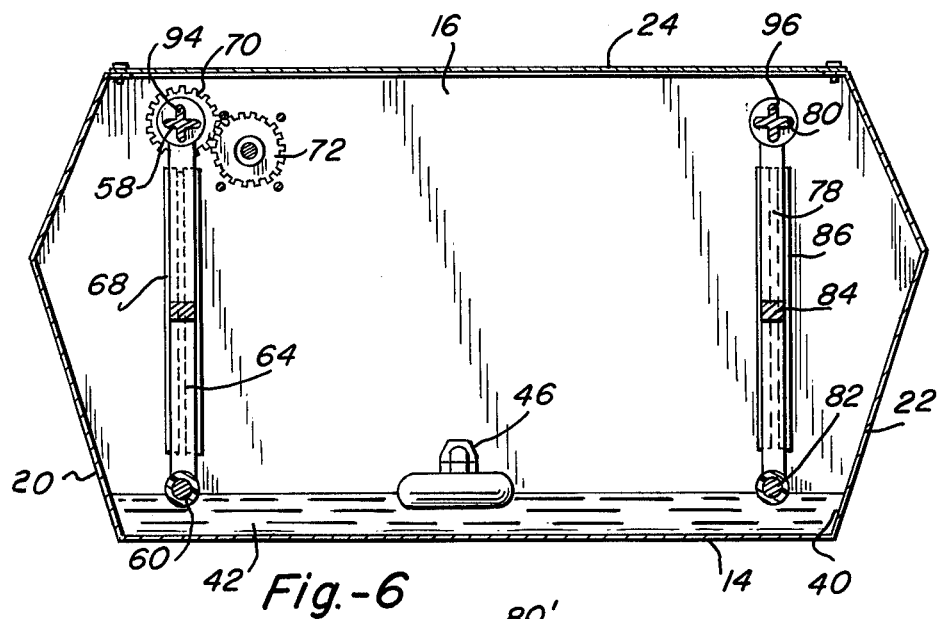
FIG. 6 is a cross-sectional view taken along the line 6—6 in FIG. 2.

A blower apparatus 100 is disposed within housing 12 between belts 56 and 74 for drawing air through inlet openings 28 and 30, belts 56 and 74 and then exhausting that air through outlet opening 48. While the blower apparatus may take various forms, it preferably utilizes a centrifugal-type blower for compactness of space and efficiency of operation. Considering desired compactness, it has been found efficient to utilize a pair of like centrifugal blowers 102 and 104. Blower 102 is illustrative in its inclusion of a manifold 106 and a squirrel-cage rotor 108 powered by an electric motor 110. Of course, the blowers are in themselves conventional sub-assemblies. In operation, they serve to draw air inwardly through openings 28 and 30 as indicated by arrows 112 (FIG. 3) and then through corresponding belts 56 and 74. The air is then exhausted by the blowers through outlet opening 48 as indicated by arrows 114.

Also included within housing 12 are braces 116 and 118 anchored between housing 12 and blower apparatus 100. Braces 116 and 118 are also so disposed as to prevent any tendency of expansion of the air-outlet side of belts 56 and 74 as a result of the incoming air flow.

Figure 8:
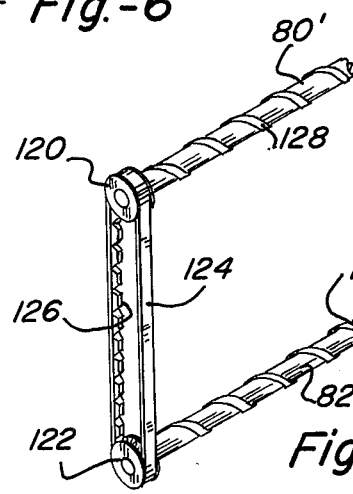
FIG. 8 is a perspective view of an alternative of a component shown in preceding ones of the figures.
Figure 7:
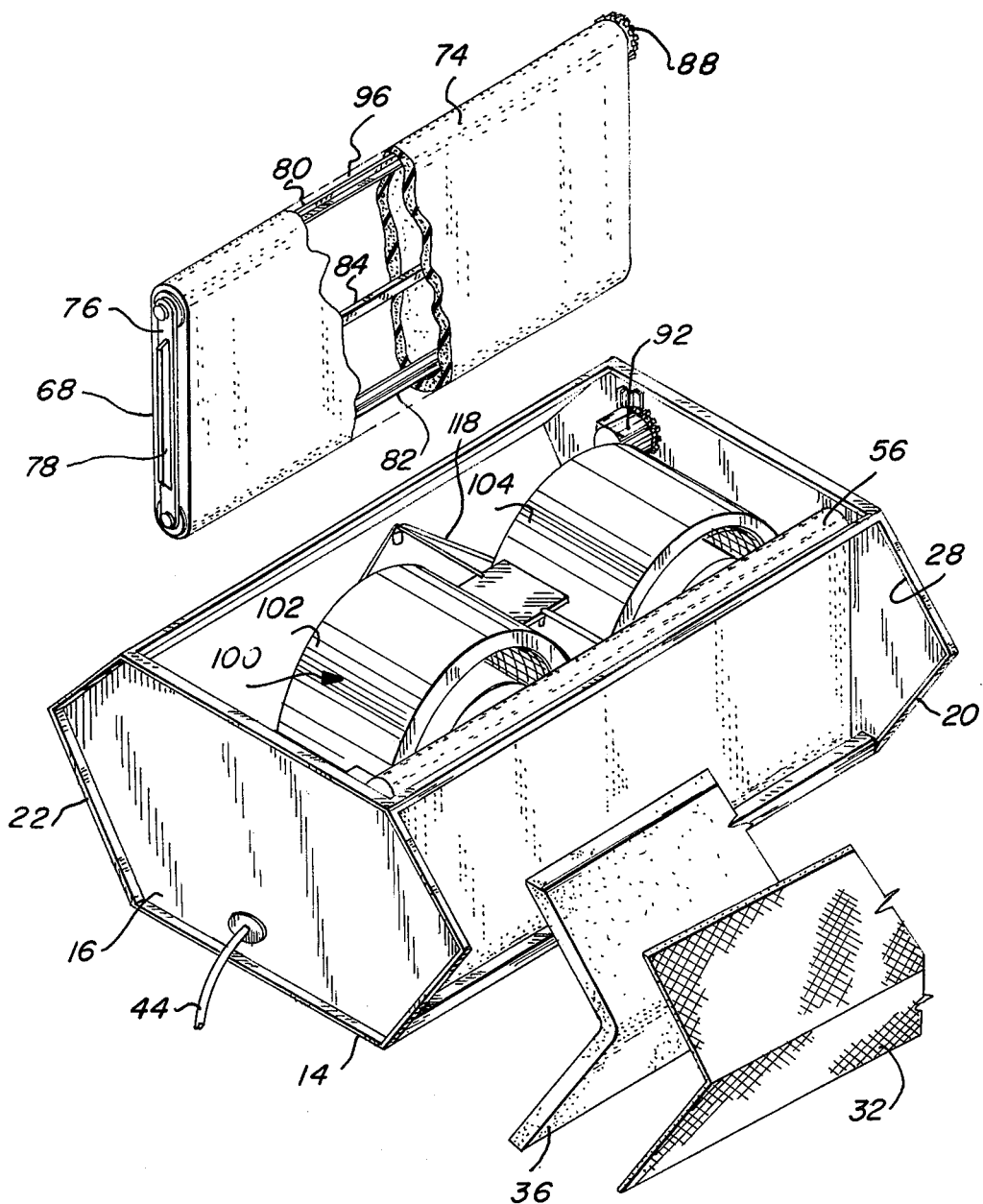
FIG. 7 is an exploded perspective view of the unit of FIG. 1 and, again, with the upper cover removed.

As so far described, all driving movement is assigned to the upper rollers by way of their splined or ribbed contact with the belts. While this has worked, it also has led to undesired wear upon the interior surfaces of the belts. In one preferred alternative, therefore, all of rollers 58, 60 and 80, 82 are of smooth circumferential contour and a drive link is included as between the upper and lower rollers. As shown in FIG. 8, for example, roller 80' is provided at one end with a pulley 120. Similarly, roller 82' carries a pulley 122. Roller 80' is driven through gear 88 as before. But a flexible belt 124, having internally projecting grips 126, transmissively couples roller 82' to roller 80'. Better traction between the rollers and the belts preferably is afforded by a spiral wrap of a strip 128 around each roller; each strip 128 may be composed of rubber foam or a foam type of PVC.

In operation of a typical embodiment, gear motors 90 and 92 serve to drive gears 70, 72 and 88, 90 at about eight revolutions per minute. The overall dimensions are elected such that belts 56 and 74 move at approximately one revolution per minute. The length and width of belts 56 and 74 are such that this results in a movement, of each belt, of about 3200 square feet per minute. With such parameters, the apparatus disclosed has been found to be an effective cooler for a space the size of a conventional mobile home or a building of modest size.

It will thus be seen that known cooling principles have been implemented in a manner which achieves a high degree of effectiveness in several respects. The filtering material is self cleaning. A desirably compact overall assembly of the apparatus is perhaps the most notable attribute. At the same time, this is achieved in a manner which still permits such advantageous features as the removability of the evaporative belt assemblies for cleaning or replacement. In addition, the arrangement exhibits a high degree of flexibility. For example, blower apparatus 100 would only need to be inverted so as to permit exhaust from the upper side of the unit. Somewhat similarly, that exhaust could be by way of end walls 16 and 18. This enables adaptation of the unit in a variety of either free-standing or attached implementations as applied with respect to the facilitation of the entrance of the cooled air into an enclosure. In any case, a unit as described affords cooling action with about 30 seconds; that compares with prior approaches which may require up to 30 minutes.

While a particular embodiment of the invention has been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:
1. An evaporative cooling system comprising:
a housing having generally upright respectively-opposing side walls and end walls joined by generally horizontal top and bottom walls;
means defining a pair of inlet openings individually in respective ones of said side walls;
means defining an outlet opening in another of said walls of said housing;
a pair of vertically-oriented generally planar rigid frames individually locatable within said housing adjacent to and substantially spanning respective ones of said inlet openings, each of said frames including space-opposed vertical end bars;
vertical channelways secured to said end walls and disposed individually on each respective side of said inlet openings, said channelways slidingly receiving corresponding different ones of said end bars;

a pair of upper rollers individually journaled for rotation between the upper end portions of the corresponding ones of said end bars of respective ones of said frames;

a pair of lower rollers individually journaled for rotation between the lower end portions of the corresponding ones of said end bars of respective ones of said frames;

a pair of endless belts individually wrapped around respective different ones of the respective combinations of said rollers and frames so as to have a hollow oblong cross section elongated in a vertical direction, said belts each being of a material to which a liquid may cling and sufficiently transparent to the flow of air therethrough to achieve evaporation of said liquid on said belt by the air;

means defining a reservoir of said liquid disposed in the lower portion of said housing and into which said lower rollers normally are immersed in use so that a portion of said belts also are immersed;

motive drive means disposed within said housing;

coupling means on each of said upper rollers for engagement with said motive drive means to drive such rollers in rotation, directly upon seating of said end bars within said channelways;

means, in addition to said belts, individually coupled between respective different ones of said upper and lower rollers for driving said lower rollers from the corresponding ones of said upper rollers;

and blower apparatus disposed in said housing and substantially occupying the space between said frames for drawing air through said inlet openings and said belts and exhausting said air through said outlet opening.

* * * * *